(12) United States Patent
Jiang

(10) Patent No.: US 9,197,731 B2
(45) Date of Patent: Nov. 24, 2015

(54) METHOD AND DEVICE FOR CHANGING DYNAMIC DISPLAY EFFECT OF MOBILE PHONE APPLICATION BY WAY OF VOICE CONTROL

(75) Inventor: Bo Jiang, Guangdong (CN)

(73) Assignee: K-PHONE TECHNOLOGY CO., LTD., Shenzhen (CN)

( * ) Notice: Subject to any disclaimer, the term of this patent is extended or adjusted under 35 U.S.C. 154(b) by 68 days.

(21) Appl. No.: 14/235,456

(22) PCT Filed: Apr. 20, 2012

(86) PCT No.: PCT/CN2012/074410
§ 371 (c)(1),
(2), (4) Date: Jan. 28, 2014

(87) PCT Pub. No.: WO2013/020387
PCT Pub. Date: Feb. 14, 2013

(65) Prior Publication Data
US 2014/0163997 A1 Jun. 12, 2014

(30) Foreign Application Priority Data
Aug. 10, 2011 (CN) .......................... 2011 1 0228263

(51) Int. Cl.
*H04M 1/725* (2006.01)
*G10L 21/00* (2013.01)

(52) U.S. Cl.
CPC ........... *H04M 1/72519* (2013.01); *G10L 21/00* (2013.01); *H04M 1/72544* (2013.01); *H04M 2250/74* (2013.01)

(58) Field of Classification Search
CPC .................... H04M 1/72519; H04M 1/72544; H04M 2250/74; G10L 21/00
USPC ......... 704/208, 209, 216–219, 226, 233, 236, 704/262–275
See application file for complete search history.

(56) References Cited

U.S. PATENT DOCUMENTS

| 8,682,374 B2 * | 3/2014 | Kim ..................... H04M 1/271 370/296 |
| 2002/0177997 A1 * | 11/2002 | Le-Faucheur ............ G10H 7/02 704/208 |

(Continued)

FOREIGN PATENT DOCUMENTS

| CN | 1492711 A | 4/2004 |
| CN | 1524350 A | 8/2004 |

(Continued)

OTHER PUBLICATIONS

1st Office Action of counterpart Chinese Patent Application No. 201110228263.4 issued on Dec. 3, 2012.

*Primary Examiner* — Marcellus Augustin

(57) ABSTRACT

This disclosure relates to methods and devices for changing dynamic display effect of mobile phone application by way of voice control. The method includes a recording step, recording an audio file of a voice external to a mobile phone; a judgment step, calculating a voice energy value linearly dependent upon sound volume in the audio file, comparing the voice energy value to a pre-set noise threshold value and performing a rate calculation step when it is greater than the pre-set noise threshold value; a rate calculation step, calculating a corresponding changing rate according to the voice energy value; and an application display step, setting the changing rate of the current application as a calculated changing rate and displaying same for the current application. This disclosure increases the approaches whereby a user controls the dynamic application changing effect and it can be applied to a mobile phone without a touch screen.

9 Claims, 3 Drawing Sheets

(56) References Cited

U.S. PATENT DOCUMENTS

| | | | |
|---|---|---|---|
| 2005/0212766 A1* | 9/2005 | Reinhardt | G06F 1/1626 345/157 |
| 2006/0069548 A1* | 3/2006 | Matsuura | G01C 21/3629 704/200.1 |
| 2009/0248409 A1* | 10/2009 | Endo et al. | 704/226 |
| 2011/0125489 A1* | 5/2011 | Shin | 704/205 |
| 2012/0297304 A1* | 11/2012 | Maxwell | 715/728 |

FOREIGN PATENT DOCUMENTS

| | | | |
|---|---|---|---|
| CN | 101466010 A | 6/2009 | |
| CN | 202059453 | * 11/2011 | H04M 1/02 |

* cited by examiner

METHOD AND DEVICE FOR CHANGING DYNAMIC DISPLAY EFFECT OF MOBILE PHONE APPLICATION BY WAY OF VOICE CONTROL

FIELD OF THE INVENTION

This disclosure relates to a technical field of mobile phone, and more particularly to methods and devices for changing dynamic display effect of mobile phone application by way of voice control.

BACKGROUND OF THE INVENTION

With progresses in science and technology, mobile phone may not only have communication function but also become an entertainment terminal for users, in which case the mobile phone should have high entertainment capability. Under such requirements, various display effects for mobile phone application, such as dynamic wallpaper and dynamic display of photo album of the mobile phone, come into being. Dynamic wallpaper exhibits dynamic effect, and it can respond to a user's action. In the case of water wave dynamic wallpaper, for example, water wave effects can be generated when the user clicks on the dynamic wallpaper, thus exhibiting the entertainment function with dynamic interactions.

However, the dynamic display of the mobile phone application in the prior art may fail to be interactive, or may only be triggered to change the dynamic display effect when receiving inputs from a touch screen or a key. For instance, the user may touch the touch screen so that the dynamic wallpaper can be driven to make effect changes. Nevertheless, many mobile phones in practical applications may not be equipped with the touch screen, where flip folding phone has no touch screen. Provided that the touch screen is added for the purpose of effect change function by touching, it may increase the cost of the mobile phone, and also increase the whole thickness of the flip phone, thus leading to poor appearance for the mobile phone. Besides, there may be insufficient interestingness when triggering the changing effect of the dynamic wallpaper through the touch screen.

SUMMARY OF THE INVENTION

The technical problem to be solved in this disclosure is to provide methods and devices for changing dynamic display effect of mobile phone application by way of voice control, aiming at the drawbacks in the prior art that the dynamic display effect of the mobile phone application cannot be changed or the user experience for mobile phone is not high when changing through the touch screen.

In this disclosure, the technical solution adopted to solve its technical problem is to provide methods and devices for changing dynamic display effect of mobile phone application by way of voice control, where dynamic effect of the mobile phone application can be triggered and a changing rate of the dynamic effect can be adjusted through collecting user voice and calculating a magnitude of voice energy.

In a first aspect of this disclosure, a method for changing dynamic display effect of mobile phone application by way of voice control is provided, which includes the following steps:

a recording step for recording an audio file of a voice external to the mobile phone;

a judgment step for calculating a voice energy value linearly dependent upon sound volume in the audio file, comparing the voice energy value to a preset noise threshold value, and performing a rate calculation step when the voice energy value is greater than the preset noise threshold value;

the rate calculation step for calculating a corresponding changing rate according to the voice energy value; and an application display step for setting the changing rate of a current application as a calculated changing rate, and displaying the current application according to the calculated changing rate.

In the method for changing dynamic display effect of mobile phone application by way of voice control in the first aspect of this disclosure, the judgment step calculates the voice energy value E through a formula below:

$$E = \sum_{i=0}^{K-1} [x(i)]^2$$

where K is a sampling number within a preset time period T, and x(i) is a data value for an $i^{th}$ sampling point.

In the method for changing dynamic display effect of mobile phone application by way of voice control in the first aspect of this disclosure, the rate calculation step calculates the changing rate V through a formula below:

$$V = P*E/T;$$

where P is a preset accommodation coefficient.

In the method for changing dynamic display effect of mobile phone application by way of voice control in the first aspect of this disclosure, it also includes a noise threshold value setup step performed before the recording step according to user input. The noise threshold value setup step is configured for recording an audio file of an ambient noise external to the mobile phone and calculating the voice energy value within the time period T in the audio file as the preset noise threshold value.

In the method for changing dynamic display effect of mobile phone application by way of voice control in the first aspect of this disclosure, the audio file recorded in the recording step is in PCM format or AMR format.

In the method for changing dynamic display effect of mobile phone application by way of voice control in the first aspect of this disclosure, the current application in the application display step can be dynamic wallpaper or dynamic display of photo album.

In a second aspect of this disclosure, a device for changing dynamic display effect of mobile phone application by way of voice control is provided, which includes a recording module, a judgment module, a rate calculation module, a mobile phone main control module and an application display module.

The recording module is configured for recording an audio file of a voice external to the mobile phone according to an inductive instruction.

The judgment module is configured for calculating a voice energy value linearly dependent upon sound volume in the audio file, comparing the voice energy value to a preset noise threshold value, and sending the voice energy value to the rate calculation module when the voice energy value is greater than the preset noise threshold value according to inductive instructions.

The rate calculation module is configured for calculating a corresponding changing rate according to the voice energy value.

The mobile phone main control module is configured for sending out the inductive instruction to start the recording module, the judgment module and the rate calculation rate and for setting the changing rate of a current application as a calculated changing rate.

The application display module is configured for displaying the current application of the mobile phone according to the changing rate of the current application.

In the device for changing dynamic display effect of mobile phone application by way of voice control in the second aspect of this disclosure, the judgment module calculates the voice energy value E through a formula below:

$$E = \sum_{i=0}^{K-1} [x(i)]^2$$

where K is a sampling number within a preset time period T, and x(i) is a data value for an $i^{th}$ sampling point.

The rate calculation step calculates the changing rate V through a formula below:

$$V=P*E/T;$$

where P is a preset accommodation coefficient.

In the device for changing dynamic display effect of mobile phone application by way of voice control in the second aspect of this disclosure, the judgment module also includes a noise threshold value storage unit. The judgment module controls the recording module to record an audio file of an ambient noise external to the mobile phone, and calculate the voice energy value within the time period T in the audio file as the preset noise threshold value, which is stored into the noise threshold value storage unit.

In the device for changing dynamic display effect of mobile phone application by way of voice control in the second aspect of this disclosure, the recording module, the judgment module, the rate calculation module and the application display module are integrated in a main board of the mobile phone.

When implementing the method and device for changing dynamic display effect of mobile phone application by way of voice control of this disclosure, the following advantageous effects can be achieved: a novel method is provided in this disclosure for triggering the changing of the dynamic effect of dynamic application of the mobile phone. This disclosure collects the user voice and calculates the magnitude of the voice energy in such a way that the dynamic effect of the dynamic application of the mobile phone can be triggered and the changing rate of the dynamic effect can be adjusted, which increases the approaches whereby the user controls the dynamic application changing effect of the mobile phone. This disclosure can be applied to the mobile phone without a touch screen to reduce cost, and it can provide strong interestingness while improving the experience and entertainment when the user uses the mobile phone.

BRIEF DESCRIPTION OF THE DRAWINGS

Below this disclosure will be further illustrated with reference to figures and embodiments. In the figures.

DETAILED DESCRIPTION OF THE PREFERRED EMBODIMENT

For the purpose of illustrating objectives, technical solutions and advantages of this disclosure more clearly, below this disclosure will be further described in detail with reference to figures and embodiments.

Figure 1:
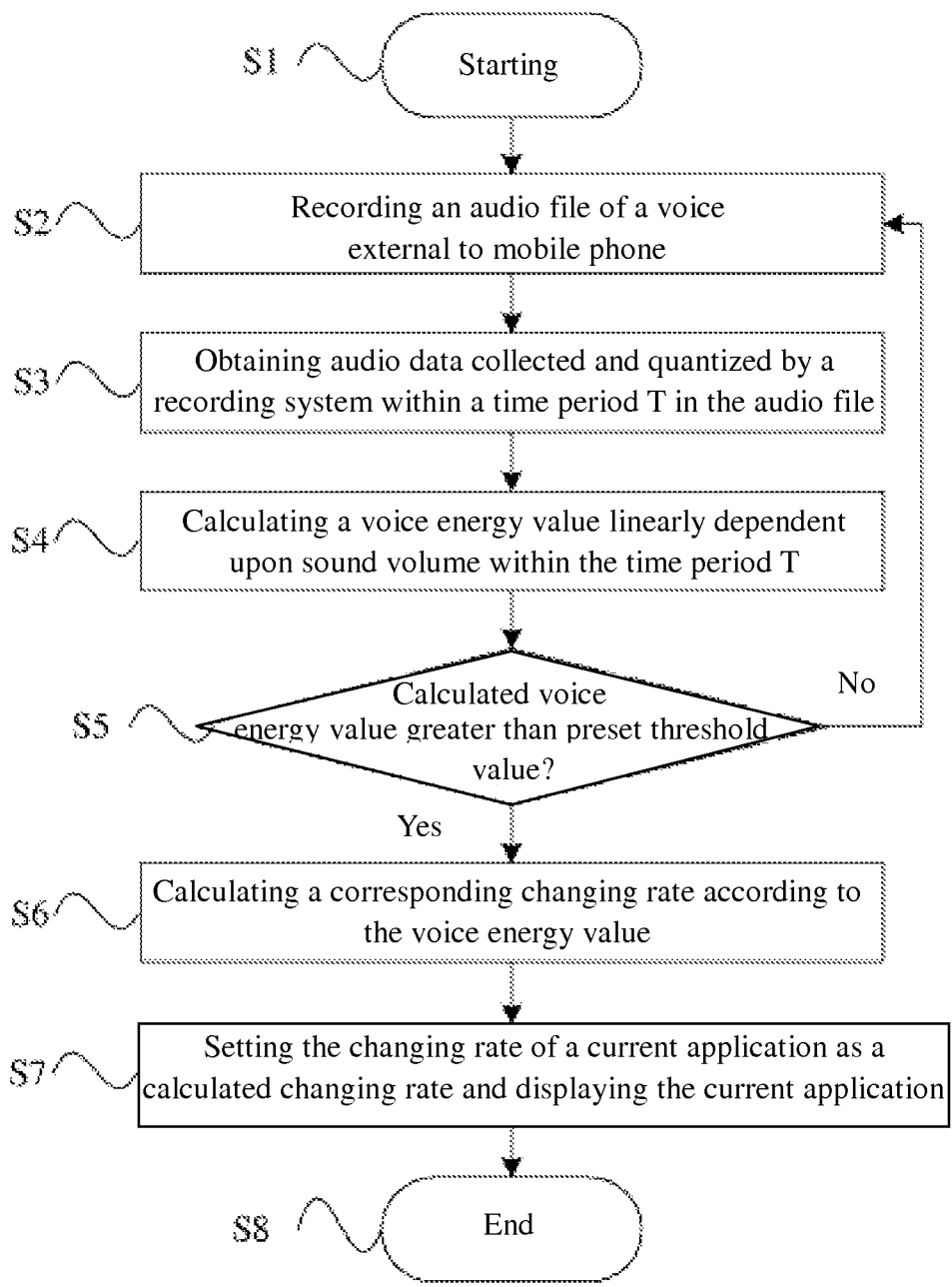
FIG. 1 is a flow chart for a method for changing dynamic display effect of mobile phone application by way of voice control in a preferred embodiment of this disclosure.

Referring to FIG. 1, it is a flow chart for a method for changing dynamic display effect of mobile phone application by way of voice control in a preferred embodiment of this disclosure. Below dynamic wallpaper will be taken as an example for illustration. Herein, this method can include the following steps.

This method may start from step S1, where before or during the display of dynamic wallpaper on the mobile phone, a voice control operation can be started by a user through manual input or a shortcut button on the mobile phone, and a voice control mode can be started by the user through a key. Alternatively, when the dynamic wallpaper is a standby interface for the mobile phone, the voice control operation can be started automatically when the mobile phone is turned into a usage state from the standby state.

In step S2, an audio file of a voice external to the mobile phone is subsequently recorded, in which the audio file can be recorded as PCM format or AMR format. For example, audio data of about 8 KHz and 16 bit in PCM format can be recorded. Collection of user voice can be realized by a call recording system built in the mobile phone.

In step S3, a time period T is then set in advance. The audio data collected and quantized by the recording system, such as these data in PCM format mentioned above, are obtained within the time period T of the audio file.

After that, a voice energy value linearly dependent upon sound volume in the audio file is calculated, where the voice energy value E can be calculated by the following formula (1):

$$E = \sum_{i=0}^{K-1} [x(i)]^2; \quad (1)$$

where K is a sampling number within the time period T, and x(i) is a data vale for an $i^{th}$ sampling point.

The voice energy value E is in linear relation with the sound volume. It should be understood that this disclosure is not limited to calculate the voice energy value linearly dependent upon the sound volume by the above-described method, while any other modes well-known to the skill in the art can also be used for such calculation.

Subsequently in step S5, the voice energy value is compared to a preset noise threshold value. When it is judged to be larger than this threshold value, step S6 will be performed to trigger the changing of the dynamic effect. Otherwise, this method may turn to step S2 to start recording once again. The noise threshold value can be an experiential default value preset by a mobile phone designer before delivery. In another preferred embodiment, this noise threshold value can also be set by the user manually. In another preferred embodiment, the method for changing dynamic display effect of mobile phone application by way of voice control can further include a noise threshold value setup step. That is, the mobile phone may be trained before starting the voice control operation by the user, where the mobile phone may pre-collect ambient noise to set the noise threshold value. For example, when the user comes into a noisy environment, the function of setting the noise threshold value can be started in advance. At this point, the mobile phone can record an audio file of the ambient noise automatically, and calculate the voice energy value within the time period T in the audio file as the preset noise threshold value. In this way, once the user starts the voice control function, the mobile phone can adjust a changing rate of the dynamic wallpaper when the collected voice is larger than the noise threshold value.

After that, a corresponding changing rate is calculated according to the voice energy value in step S6. Linear relation can be directly set between the changing rate of the dynamic effect and the magnitude of the voice energy value, namely, the larger the voice energy value, the faster the changing effect. The changing rate V can be calculated by the following formula (2):

$$V = P*E/T; \qquad (2)$$

where P is a preset accommodation coefficient, namely a parameter value for adjusting the whole changing rate.

In step S7 thereafter, the changing rate of a current application is set to be a calculated changing rate, and the current application is displayed according to the calculated changing rate. The current application referred here can be the dynamic wallpaper or dynamic display of photo album.

Figure 2:
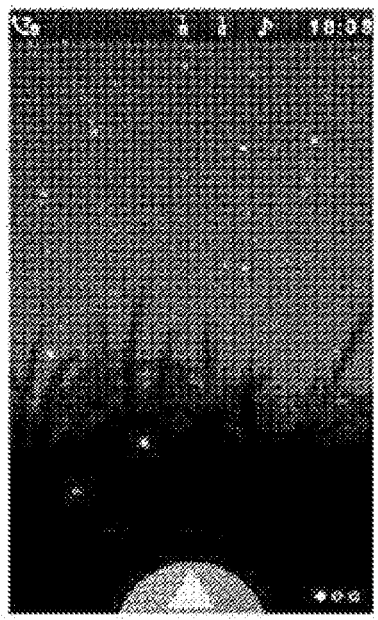
FIG. 2 is a schematic diagram illustrating a dynamic display effect of a mobile phone application before being changed by way of voice control in a preferred embodiment of this disclosure.
Figure 3:
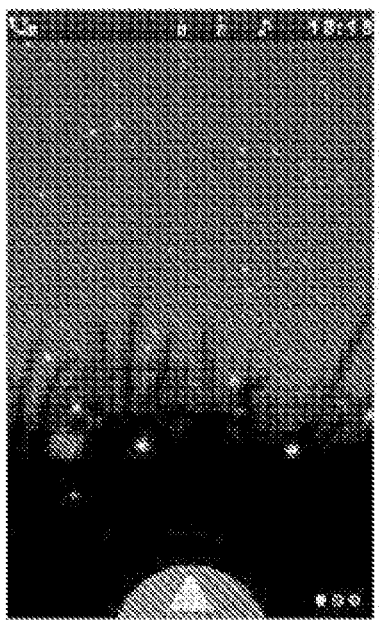
FIG. 3 is a schematic diagram illustrating a dynamic display effect of a mobile phone application after being changed by way of voice control in a preferred embodiment of this disclosure.

Referring to FIGS. 2-3, they are respectively schematic diagrams illustrating dynamic display effects of a mobile phone application before and after being changed by way of voice control. These two figures are glowworm dynamic wallpapers, namely different numbers of glowworms can fly from nightly grass according to a certain changing rate when receiving user control. In this disclosure, the dynamic wallpaper before the voice control is as shown in FIG. 2, in which there are too few glowworms. After starting the voice control operation, the dynamic wallpaper may not be changed in case that the recorded user sound volume is small and the calculated voice energy value is lower than the noise threshold value; when the recorded user sound volume is slightly larger than the noise threshold value, the dynamic wallpaper may change dynamically at a low rate and thus a few glowworms may fly from the grass slowly; in the event that the recorded user sound volume is much larger than the noise threshold value, the dynamic wallpaper may have quick dynamic changes and thus many glowworms may fly from the grass quickly as shown in FIG. 3.

Figure 4:
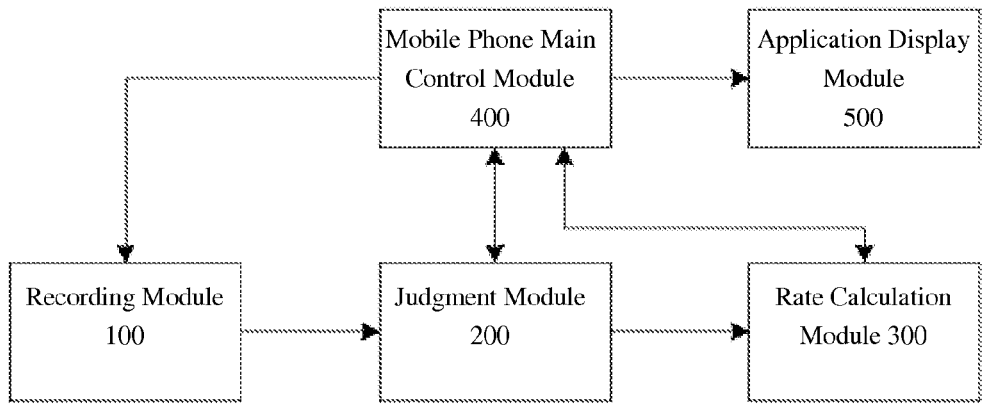
FIG. 4 is a module diagram for a device for changing dynamic display effect of mobile phone application by way of voice control in a preferred embodiment of this disclosure.

Referring to FIG. 4, it is a module diagram for a device for changing dynamic display effect of mobile phone application by way of voice control in a preferred embodiment of this disclosure. As shown in FIG. 4, the device in this embodiment include a recording module 100, a judgment module 200, a rate calculation module 300, a mobile phone main control module 400 and an application display module 500.

The mobile phone main control module 400 is configured for sending out an inductive instruction to start the recording module 100, the judgment module 200 and the rate calculation rate 300. In one preferred embodiment of this disclosure, before or during the display of dynamic wallpaper on the mobile phone, a voice control operation can be started by a user through manual input, a voice control mode can be started by a user through a key, or a voice control function can be directly started by a user through a shortcut button on a mobile phone, while the inductive instruction is sent by the mobile phone main control module 400 in this embodiment. Alternatively, when the dynamic wallpaper is a standby interface for the mobile phone, the mobile phone main control module 400 can detect that the mobile phone is turned into a usage state from a standby state so that the voice control operation can be started automatically. The mobile phone main control module 400 can be integrated in a main board of the mobile phone.

The recording module 100 is configured for recording an audio file of a voice external to the mobile phone. The recording module 100 can be realized by a call recording system built in the mobile phone. Before or during the display of the dynamic wallpaper on the mobile phone, the voice control operation can be started by the user through manual input, or the voice control mode can be started by the user through a key, or the voice control operation of the recording module 100 can be directly started by the user through a shortcut button on the mobile phone. The recording module 100 can record the audio file of PCM format or AMR format. For example, audio data of about 8 KHz and 16 bit in PCM format can be recorded.

The judgment module 200 is configured for calculating a voice energy value linearly dependent upon sound volume in the audio file, comparing the voice energy value to a preset noise threshold value, triggering the changing of the dynamic effect when the voice energy value is greater than the preset noise threshold value, and sending the voice energy value to the rate calculation module 300 according to the inductive instruction.

The judgment module 200 can be integrated in the main board of the mobile phone. It can be realized by corresponding software mounted in the mobile phone, while it can also be realized by any other programmable logic devices. A time period T is preset in the judgment module 200. Herein, the audio data collected and quantized by the recording system, such as the data in PCM format mentioned above, are obtained within the time period T in the audio file. The judgment module 200 then calculates the voice energy value linearly dependent upon the sound volume in the audio file, where the above-describe formula (1) can be used for calculating the voice energy value E. The voice energy value E is in linear relation with the sound volume. It should be understood that this disclosure is not limited to calculate the voice energy value linearly dependent upon the sound volume by the above-described method, while any other modes well-known to the skill in the art can also be used for such calculation.

After calculating the voice energy value E, the judgment module 200 compares it with the preset noise threshold value. When the voice energy value is judged to be larger than this threshold value, the dynamic effect is triggered to be changed. Otherwise, some instructions are sent to the recording module 100 to start recording once again. The noise threshold value can be an experiential default value preset by a mobile phone designer before delivery. In another preferred embodiment, this noise threshold value can also be set by the user manually. In another preferred embodiment, the judgment module 200 can preferably include a noise threshold value storage unit. It can further send the voice energy value of ambient noise external to the mobile phone recorded by the recoding module to the noise threshold value storage unit for storing. That is, the mobile phone may be trained before starting the voice control operation by the user, where the mobile phone may pre-collect ambient noise to set the noise threshold value. For example, when the user comes into a noisy environment, the function of setting the noise threshold value can be started in advance. At this point, the mobile phone can record an audio file of the ambient noise automatically, and calculate the voice energy value within the time period T in the audio file as the preset noise threshold value. In this way, once the user starts the voice control function, the mobile phone can adjust the changing rate of the dynamic wallpaper when the collected voice is larger than the noise threshold value.

After receiving the inductive instruction, the rate calculation module 300 calculates a corresponding changing rate according to the voice energy value. The rate calculation module 300 can be integrated in the main board of the mobile phone. It can be realized by corresponding software mounted in the mobile phone, while it can also be realized by any other programmable logic devices. Linear relation can be directly set between the changing rate of the dynamic effect and the magnitude of the voice energy value by the rate calculation module 300, namely, the larger the voice energy value, the faster the changing effect. The changing rate V can be calculated by the following formula (2):

$$V = P * E / T; \qquad (2)$$

where P is a preset accommodation coefficient, namely a parameter value for adjusting the whole changing rate.

After obtaining a calculated changing rate mentioned above, the mobile phone main control module 400 sets the changing rate of a current application as the calculated changing rate.

The application display module 500 is configured for displaying the current application of the mobile phone according to the changing rate of the current application. The application display module 500 can be integrated in the main board of the mobile phone. It can be realized by corresponding software mounted in the mobile phone, while it can also be realized by any other programmable logic devices. The current application here can be the dynamic wallpaper or dynamic display of photo album.

Figure 5:
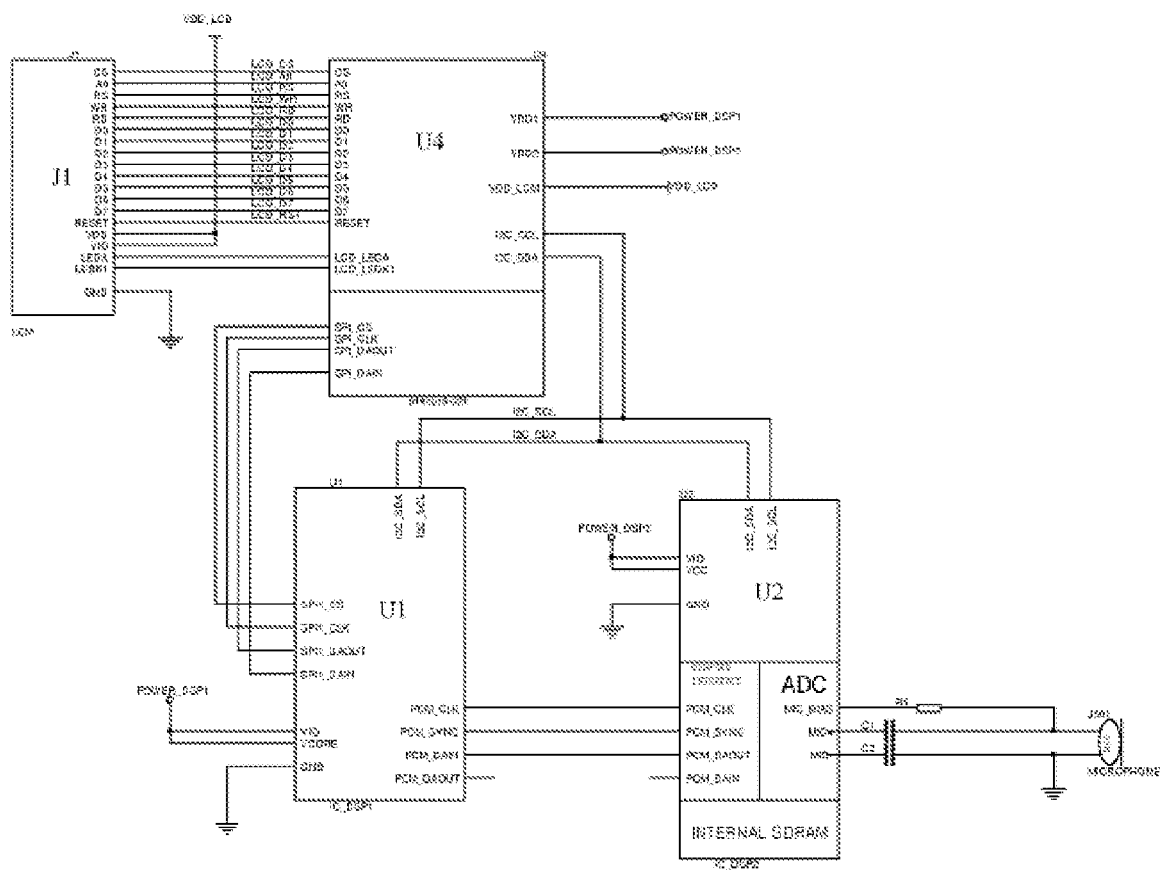
FIG. 5 is a circuit diagram for a device for changing dynamic display effect of mobile phone application by way of voice control in a preferred embodiment of this disclosure.

Referring to FIG. 5, it is a circuit diagram for a device for changing dynamic display effect of mobile phone application by way of voice control in a preferred embodiment of this disclosure. As shown in FIG. 5, the recoding module 100 includes a recording chip U2, which is a DSP chip embedded with relevant programs for controlling microphone recording. The judgment module 200 includes a judgment chip U3, which is a DSP chip embedded with relevant programs for judgment. The rate calculation module 300 and the mobile phone main control module 400 are realized by integration into a mobile phone main board circuit U4, and the application display module 500 includes an LCM chip J1.

In this embodiment, the mobile phone main board circuit U4 communicates with the recording chip U2 and the judgment chip U3 by sending the inductive instructions through I2C_SDA and I2C_SDC. The recording chip U2 sends signals to the microphone to start recording through MIC_BIAS, MIC+ and MIC−.

The recording chip U2 may start recording after receiving the inductive command, which specifically refers to recording the audio file of the voice external to the mobile phone. Some relevant data are outputted to PCM_DAIN of the judgment chip U3 from the recording chip U2 through a data interface PCM_DAOUT. The judgment chip U3 first calculates the voice energy value E, and then compares it with the preset noise threshold value. The dynamic effect is triggered to be changed when judging that the voice energy value is larger than this threshold value, and then this voice energy value is outputted to SPI_DAIN of the mobile phone main board circuit U4 through SPI1_DAIN.

After receiving the inductive instruction, the rate calculation module in the mobile phone main board circuit U4 can calculate the corresponding changing rate according to the voice energy value and send the changing rate to the mobile phone main control module. The mobile phone main control module then set the changing rate of the current application as the calculated changing rate, and the LCM chip J1 is used for display thereafter. The mobile phone main board circuit U4 can also play sound effect through a loudspeaker.

Although independent chips are used for implementing the recording module, the judgment module and the application display module in this embodiment, the skill in the art can understand that this disclosure is not limited to this implementation while instead all the above-described modules can be integrated in the main board of the mobile phone. In this case, the microphone is controlled to record the audio file by the main board of the mobile phone, corresponding identification software is mounted in the mobile phone system to achieve those processes of recording, judgment and rate calculation, and the display and/or loudspeaker of the mobile phone are/is used for playing the dynamic effects. As a result, the above-described functions can be realized by mounting the corresponding software without adding any hardware.

Through the descriptions above, novel methods and devices are provided in this disclosure for changing the dynamic display effect of the mobile phone applications by way of voice control. This disclosure collects user voice and calculates the magnitude of the voice energy. In this way, the dynamic display of the mobile phone application (e.g. the dynamic effect of the dynamic wallpaper or the dynamic photo album) can be triggered to be changed, and the changing rate of the dynamic effect can be adjusted. This disclosure not only provides a new triggering approach whereby the user controls the mobile phone application, but also can be applied to the mobile phone without a touch screen to reduce cost. Besides, it can provide strong interestingness while improving the experience and entertainment when the user uses the mobile phone.

Although this disclosure is described according to specific embodiments, the skill in the art should understand that various changes and equivalents can be made without departing from the scope of protection of this disclosure. Besides, many amendments can be made to this disclosure without departing from its scope of protection so as to be adaptive for specific situation or material of this disclosure.

Therefore, this disclosure should not be limited to the specific embodiments disclosed herein, while it should include all the embodiments fallen within the scope of protection of the claims.

The invention claimed is:

1. A method for changing dynamic display effect of mobile phone application by way of voice control, comprising:
   recording a first audio file of a voice external to the mobile phone;
   calculating a voice energy value linearly dependent upon sound volume in the first audio file, comparing the voice energy value to a preset noise threshold value, and performing a rate calculation when the voice energy value is greater than the preset noise threshold value, wherein the rate calculation comprises calculating a corresponding changing rate according to the voice energy value;
   setting the changing rate of a current application as a calculated changing rate; and
   displaying the current application according to the calculated changing rate;

wherein the voice energy value E is calculated through a formula below:

$$E = \sum_{i=0}^{K-1}[x(i)]^2$$

where K is a sampling number within a preset time period T, and x(i) is a data value for an ith sampling point;
wherein the changing rate V is calculated through a formula below:

$$V=P*E/T;$$

where P is a preset accommodation coefficient.

2. The method for changing dynamic display effect of mobile phone application by way of voice control of claim 1, wherein further comprising determining the preset noise threshold value before recording the first audio file according to user input;
wherein determining the preset noise threshold value comprises recording a second audio file of an ambient noise external to the mobile phone and calculating the voice energy value within a time period T in the second audio file as the preset noise threshold value.

3. The method for changing dynamic display effect of mobile phone application by way of voice control of claim 1, wherein the first audio file is in PCM format or AMR format.

4. The method for changing dynamic display effect of mobile phone application by way of voice control of claim 1, wherein the current application is dynamic wallpaper or dynamic display of photo album.

5. A device for changing dynamic display effect of mobile phone application by way of voice control, wherein comprising a recording chip, a judgment chip, a rate calculation circuit, a mobile phone main control circuit and an application display chip;
the recording chip is configured for recording a first audio file of a voice external to the mobile phone according to an inductive instruction;
the judgment chip is configured for calculating a voice energy value linearly dependent upon sound volume in the first audio file, comparing the voice energy value to a preset noise threshold value, and sending the voice energy value to the rate calculation circuit when the voice energy value is greater than the preset noise threshold value according to the inductive instruction;
the rate calculation circuit is configured for calculating a corresponding changing rate according to the voice energy value;
the mobile phone main control circuit is configured for sending out the inductive instruction to start the recording chip, the judgment chip and the rate calculation circuit and for setting the changing rate of a current application as a calculated changing rate;
the application display chip is configured for displaying the current application of the mobile phone according to the changing rate of the current application;
wherein the judgment chip is configured to calculate the voice energy value E through a formula below:

$$E = \sum_{i=0}^{K-1}[x(i)]^2$$

where K is a sampling number within a preset time period T, and x(i) is a data value for an ith sampling point;
the rate calculation circuit is configured to calculate the changing rate V through a formula below:

$$V=P*E/T;$$

where P is a preset accommodation coefficient.

6. The device for changing dynamic display effect of mobile phone application by way of voice control of claim 5, wherein the judgment chip also comprises a noise threshold value storage chip; the judgment chip is configured to control the recording chip to record a second audio file of an ambient noise external to the mobile phone, and calculate the voice energy value within the time period T in the second audio file as the preset noise threshold value, which is stored into the noise threshold value storage chip.

7. The device for changing dynamic display effect of mobile phone application by way of voice control of claim 6, wherein the recording chip, the judgment chip, the rate calculation circuit and the application display chip are configured to be integrated in a main board of the mobile phone.

8. The device for changing dynamic display effect of mobile phone application by way of voice control of claim 5, wherein the recording chip, the judgment chip, the rate calculation circuit and the application display chip module are configured to be integrated in a main board of the mobile phone.

9. A device for changing dynamic display effect of mobile phone application by way of voice control, comprising one or more circuits; wherein the one or more circuits are configured for:
recording an audio file of a voice external to the mobile phone;
calculating a voice energy value linearly dependent upon sound volume in the audio file as follows:

$$E = \sum_{i=0}^{K-1}[x(i)]^2,$$

where E is the voice energy value, K is a sampling number within a preset time period T, and x(i) is a data value for an ith sampling point;
comparing the voice energy value to a preset noise threshold value, and calculating a corresponding changing rate according to the voice energy value when the voice energy value is greater than the preset noise threshold value; wherein the changing rate is calculated as follows: V=P*E/T; where V is the changing rate and P is a preset accommodation coefficient;
setting the changing rate of a current application as a calculated changing rate; and
displaying the current application according to the calculated changing rate.

* * * * *